United States Patent
Remy et al.

(10) Patent No.: US 7,311,493 B2
(45) Date of Patent: Dec. 25, 2007

(54) METAL SHEET, INCLUDING MEANS FOR FIXING IT TO A SUPPORT AND A GASKET SEAL

(75) Inventors: Christophe Remy, Flexhe Le Haut Clocher (BE); Frederic Mahy, Le Mee sur Seine (FR)

(73) Assignee: SNECMA Moteurs, Paris (FR)

( * ) Notice: Subject to any disclaimer, the term of this patent is extended or adjusted under 35 U.S.C. 154(b) by 490 days.

(21) Appl. No.: 11/012,251

(22) Filed: Dec. 16, 2004

(65) Prior Publication Data

US 2005/0229357 A1 Oct. 20, 2005

(30) Foreign Application Priority Data

Dec. 16, 2003 (FR) .................................. 03 14772

(51) Int. Cl.
*F01D 9/00* (2006.01)
*F02F 11/00* (2006.01)
*F16B 43/82* (2006.01)

(52) U.S. Cl. ...................... 415/185; 277/593; 411/903; 411/542

(58) Field of Classification Search ................ 277/593, 277/616, 651; 415/185; 411/900, 901, 902, 411/903, 542
See application file for complete search history.

(56) References Cited

U.S. PATENT DOCUMENTS

| 4,957,403 A | 9/1990 | Corain et al. |
| 6,460,859 B1 * | 10/2002 | Hammi et al. ............. 277/596 |
| 6,536,775 B1 | 3/2003 | Inciong |

FOREIGN PATENT DOCUMENTS

GB 811 718 4/1959

* cited by examiner

*Primary Examiner*—Richard A. Edgar
(74) *Attorney, Agent, or Firm*—Oblon, Spivak, McClelland, Maier & Neustadt, P.C.

(57) ABSTRACT

The metal sheet of the invention includes means for fixing it to a support and a seal gasket laid out along these means. The fixing means comprise at least one lumen provided on the metal sheet by punching, with a cavity for receiving a head of a fixing component corresponding to a metal sheet portion protruding on the opposite face and a washer for transferring stresses between the metal sheet and the support on said protruding portion.

9 Claims, 2 Drawing Sheets

METAL SHEET, INCLUDING MEANS FOR FIXING IT TO A SUPPORT AND A GASKET SEAL

The invention relates to fixing a metal sheet to a support, in particular the fixing of a cowl-forming metal sheet of a part swept by a fluid, such as a strut of a turbojet engine.

A turbojet engine comprises struts for connecting components with each other, for example struts for connecting or supporting casings, for the passing and protection of fluid ducts of electrical cables. Each strut includes a strut cowl, generally made with an assembly of die cast or machined parts, forming portions of metal sheets, screwed to a support of the strut, for example a shoe supporting the strut.

The strut cowl forms the whole or a portion of the external envelope of the strut. If it is positioned inside a gas flow, it should not interfere with it. In particular, the heads of the screws for fixing the cowl to the support should not protrude out of the external surface of the cowl. In addition, the fixing of the strut cowl to its support should be achieved sealably. This fixture should also allow the cowl to be easily disassembled.

FIG. 1 illustrates a partial sectional view of a strut cowl or of any other cowling component 1 of the prior art, fixed on a support 2. The strut cowl 1 generally consists of a set of aluminum parts, the support 2 being in steel. The cowl 1 comprises a series of lumens 3 for the passage of fixing screws to the support 2, along its periphery. Each lumen 3 is made by milling into the thickness of the aluminum parts, in order to receive a screw 4, including a stem 5 and a flat head 6 with a frustra-conical surface. Each lumen 3 is conformed so that, as soon as the screw 4 is in its fixing position, its head 6 does not protrude out of the external surface of the cowl 1.

An elastomeric material gasket 7 is positioned between both surfaces resting against each together, along the periphery of the cowl 1. This gasket 7 exists as a strip, including two internal side bulges 8, 8' and is perforated with lumens 9 for the passage of the screws 4 corresponding to the lumens 3 of the cowl 1. The gasket 7 provides the seal for fixing the cowl 1 to the support 2.

This embodiment of the fixing of the strut cowl 1 to its support 2 has drawbacks. First of all, the cowl 1 should have sufficient thickness to contain the head 6 of the screw 4 without the latter protruding therefrom. This constraint of having the screw head 6 not protruding out of the external surface of the cowl 1 generally imposes a very small range of the frustra-conical portion of the screw head 6 in the lumen 3. Poor positioning and screwing of the screw 4 associated with uncontrolled tightening may cause the screw 4 to pass through the cowl 1 and deteriorate the latter. In addition, upon screwing the screw 4, compression of the gasket 7 is not under control, so that a uniform assembly of the cowl 1 on its support 2 cannot be guaranteed and this may allow the cowl 1 to deform around the screwing points of the screws 4. Finally, the assembly of aluminum parts forms an extremely stiff cowl 1, the assembly and the disassembly of which is not easy.

The present invention is directed to overcoming these drawbacks.

For this purpose, the invention relates to a metal sheet including means for fixing it to a support, a gasket seal laid out along these means, characterized by the fact that the fixing means comprise at least one lumen provided on the metal sheet by punching, with a cavity for receiving a head of a fixing component corresponding to a protruding metal sheet portion on the opposite face and a washer for transferring stresses between the metal sheet and the support on said protruding portion.

The cavity for receiving a head of the fixing component, obtained by punching, may contain a head of a fixing component with a larger size than the thickness of the metal sheet, in particular a screw head with a frustra-conical portion having a larger range than the thickness of the metal sheet. The guiding length of the fixing component in the receiving cavity is also longer. In addition, the compression of the gasket and caulking on the metal sheet and its support may be controlled with the washer for transferring stresses.

Advantageously, the washer is integral with the gasket.

Advantageously, in this case, the washer is integrated into the gasket during the molding thereof.

Preferably, the washer includes at least a lug perforated with a hole for receiving the gasket material.

In the preferred embodiment of the invention, the gasket is in an elastomeric material and the washer is in metal.

The invention is particularly applied to a strut cowl of a turbojet engine, but the applicant does not intend to limit the scope of her rights to this application.

By having the cavity for receiving a head of a fixing component, with a larger size than the thickness of the metal sheet, it is possible to form the cowl with a thinner metal sheet than in the prior art. As this metal sheet is more flexible, it is possible to assemble and disassemble it even if the cowl is formed with this metal sheet as a single piece. It is therefore possible, by the invention, to form the cowl with a one-piece metal sheet.

In the description, we place ourselves along an edge of the metal sheet. Hence, by axial and transverse, we mean axial and transverse relatively to the axis of the edge of the metal sheet, at the relevant point of the edge. The metal sheet is laid out so as to be fixed onto a support. By internal or external, we mean inwards or outwards, considering the interior to be located on the side of the support relatively to the metal sheet.

The invention will be better understood by means of the following description of the preferred embodiment of the metal sheet of the invention, with reference to the appended drawing, wherein.

The invention is described here in relation with a metal sheet forming a strut cowl of a turbojet engine.

Figure 1:
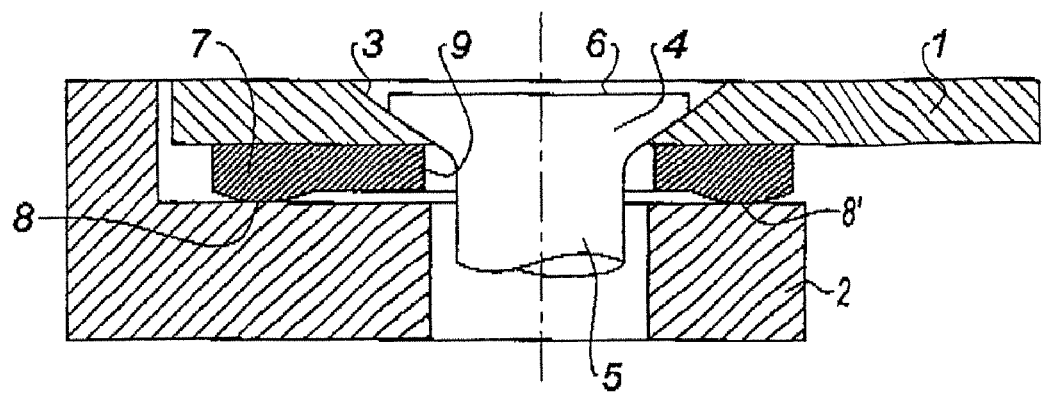
FIG. 1 illustrates a transverse partial sectional view of a strut cowl of a turbojet engine of the prior art, fixed onto its support.
Figure 2:
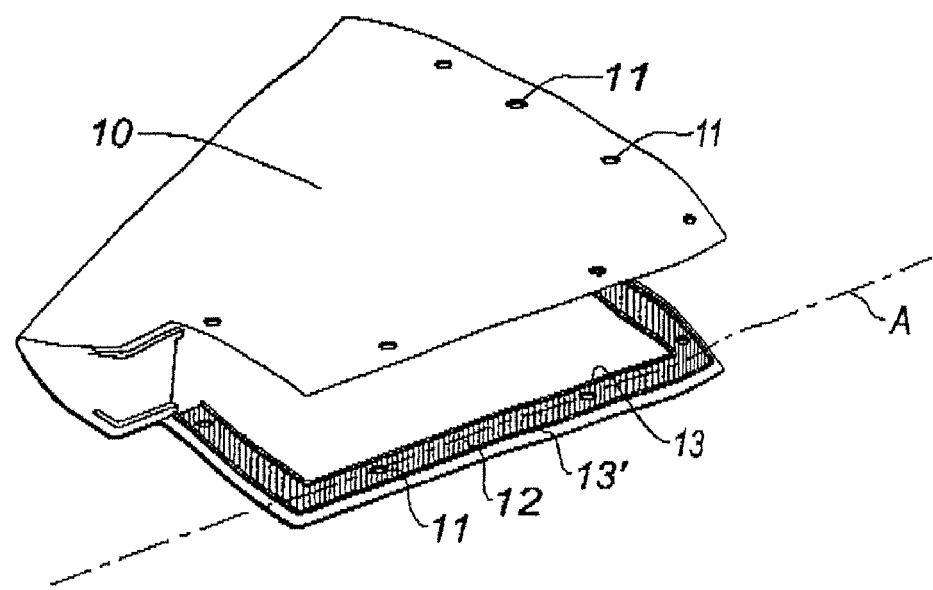
FIG. 2 illustrates a perspective view of the preferred embodiment of the metal sheet of the invention forming a turbojet engine strut cowl.

With reference to FIG. 2, a strut turbojet engine cowl 10 comprises a folded metal sheet open at all its side faces, except at the one corresponding to the folding. The metal sheet 10 is laid out so as to be fixed to a support by screwing through lumens 11 distributed along the unfolded edges of the cowl 10. A seal gasket 12, here in an elastomeric material, is adhered along the edges of the metal sheet 10 including the lumens 11. This gasket 12 exists as a strip, parallel to the edges of the metal sheet 10 to which it adheres. It comprises, throughout its length, two side bulges 13, 13' protruding inwards.

In the following, a description will be made in relation with a particular edge of the rectilinear metal sheet 10 along which a gasket 12 extending along an axis A is adhered.

Figure 3:
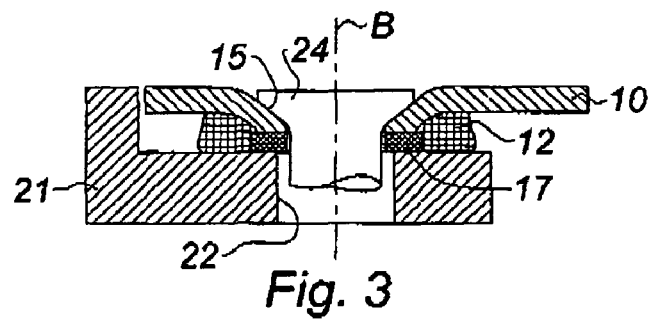
FIG. 3 illustrates a transverse sectional view of the preferred embodiment of the metal sheet of the invention, screwed onto a support.
Figure 4:
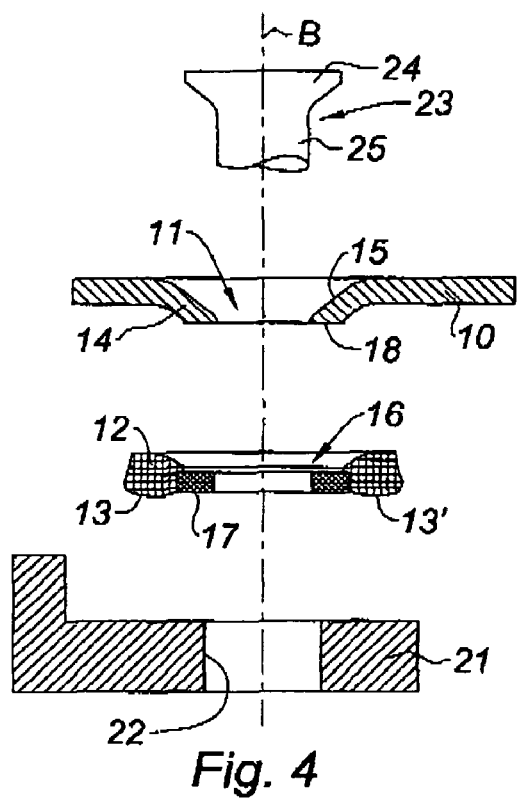
FIG. 4 illustrates an exploded transverse sectional view of the metal sheet and support of FIG. 3.

With reference to FIGS. 3 and 4, each lumen 11 is made by punching the metal sheet 10. Consequently, the metal sheet 10 has around each lumen 11 a deformed circular metal sheet area 14, having a cavity on a face corresponding to a protruding portion on the other face. Its formation is for example related to the action of a stamping punch on the metal sheet 10 in a die, which further perforates the lumen 11, forms this embossed area in the direction of its stroke.

The drawn area 14 protrudes on the face of the metal sheet 10 turned towards the support and provides on its opposite face, a cavity for receiving a screw head 15. The surface of this cavity 15 is overall frustra-conical. It extends in the direction of axis B of the lumen 11, perpendicular to the global surface of the metal sheet 10 in this region, in a larger depth than that of the thickness of the metal sheet, because of the deformation of area 14.

Facing each lumen 11 of the metal sheet 10, the gasket 12 includes a corresponding lumen 16. A metal washer 17 on the internal side of the gasket 12 is integrated within this lumen 16.

The metal washer 17 is integral with the gasket 12. To do this, advantageously, it is directly inserted into the mold for forming the gasket 12. Hence, when the elastomeric material, injected into the mold in the viscous state, passes from this state to the final flexible state, the washer is set in the bulk and remains integral with it.

Figure 5:
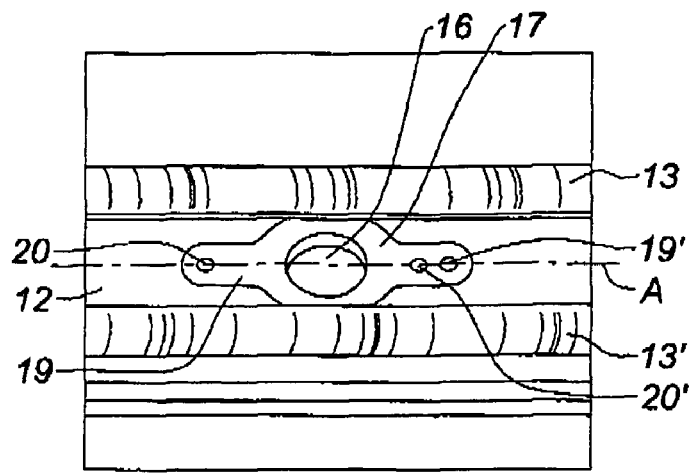
FIG. 5 illustrates a perspective view of the gasket and washer of the preferred embodiment of the metal sheet of the invention.

With reference to FIG. 5, in order to ensure cohesion of the hole formed by the gasket 12 and the washer 17, the latter comprises two opposite lugs 19, 19', each perforated with a hole 20, 20', respectively, on the washer 17. When the washer 17 is integrated into the gasket, the lugs 19, 19' are positioned along the axis A of the gasket 12. When the elastomeric material is injected into its mold, the latter in a viscous state, penetrates into the holes 20, 20' of the lugs 19, 19', then solidifies, whereby the lugs 19, 19' are made integral with the gasket 12.

A third perforation unnumbered here may be provided on a lug 19, 19' of the gasket 17, which is a positioning perforation of the washer 17 in the injection mold, helpful for positioning and orientating the washer 17 just before molding the gasket 12.

The washer 17 is thereby adhered to the gasket 12 on a portion of its external surface, on its side surfaces, on a portion of its internal surface, at the bulges 13, 13' and in the holes 20, 20' of the lugs 19, 19'. The washer 17 is therefore integral with the gasket 12, which largely facilitates the assembly of the gasket 12 and the washers 17 on the metal sheet 10 and avoids losing the washer 17. The self-containment of the whole formed by the metal sheet 10, the gasket 12 and the washers 17, largely facilitates the assembly and disassembly of the strut cowl during engine maintenance operations for example.

The internal and external surfaces of the metal washer 17 at least partially extend within the space of the lumen 16 provided in the gasket 12.

The gasket 12 is adhered around its lumen 16 onto the internal face of the drawn area 14 of the metal sheet 10. The protruding edge 18 of the drawn area 14 of the metal sheet 10 is laid out, for example by mechanical rework, so as to exhibit a surface perpendicular to the axis B of the lumen 11. The drawn area 14 of the metal sheet 10, the gasket 12 and the washer 17 are dimensioned so that when the gasket 12 and the washer are adhered onto the metal sheet 10, the protruding edge 18 of the area 14 of the metal sheet 10 is in contact with the metal washer 17.

Hence, after adhering the gasket 12 and washers 17 on the metal sheet 10, the latter comprises a series of screw clearance lumens 11, each lumen being surrounded on its external face by a cavity for receiving a screw head 15, and on its internal face by a metal washer 17 and the gasket 12.

In particular, when the metal sheet 10 is laid on a support 21 so as to be fixed thereon, there may not be any contact between the metal sheet 10 and the support 21, because of the interposition of the washer 17 and the gasket 12. This is advantageous because the support is in a different metal from that of the metal sheet and a too large caulking stress should be avoided on the metal sheet 10 and the support 21.

Fixing the metal sheet 10 on the support 21 is performed conventionally. The metal sheet 10 is placed on the support 21, so that each lumen 11 of the metal sheet is located at right angles with respect to a bore 22 of the support 21 for receiving a screw 23. Each screw 23 includes a head 24 and a stem 25. The stem 25 of a screw 23 is introduced through the lumen of the metal sheet 10 and the washer 17, into the bore 22 of the support 21. It is screwed in and its head 24 engages with the surface for receiving a screw head 15 of the metal sheet, with a complementary shape, whereby its head does not jut out from the surface of the metal sheet 10, once the screw 23 is screwed in.

During the screwing operation, the bulges 13, 13' of the gasket 12 are compressed between the metal sheet 10 and the support 21, until the metal washer 17 engages with the external surface of the support 21. The washer 17 thereby fulfills its dual function, controlling the compression of the gasket 12, the latter being stopped by the washer 17 pressing against the external surface of the support 21 and transferring stresses between the metal sheet 10 and the support 21. The stress recovery function is ensured because the washer 17 provides a larger contact surface with the support 21 than that of the protruding edge 18 of the deformed area 14 of the metal sheet 10; the screwing pressure thereby being distributed over this surface. The compressed gasket 12 additionally ensures a sealing function between the metal sheet 10 and the support 21.

The metal sheet of the invention has been described in relation with screw fixtures. It is obvious that the invention may be applied to any metal sheet laid out in order to be fixed to a support via a fixing component including a head and a stem, and in particular to any metal sheet forming an aerodynamic cowling component.

The lugs of the washer of the metal sheet of the invention may be of the same thickness or not than the remainder of the washer. Each lug may also be splitted into two internal and external lugs.

The invention claimed is:

1. A metal sheet including means for fixing to a support, a seal gasket laid out along these means, characterized by the fact that the fixing means comprise at least one lumen provided on the metal sheet by punching, with a cavity for receiving a head of a fixing component corresponding to a metal sheet portion protruding on the opposite face and a washer for transferring stresses between the metal sheet and the support on said protruding portion.

2. The metal sheet according to claim 1, wherein the fixing component is a screw.

3. The metal sheet according to claim 1, wherein the washer 17 is integral with the gasket.

4. The metal sheet according to claim 3 wherein the washer is integrated into the gasket during the molding thereof.

5. The metal sheet according to claim 4 wherein the washer includes at least one lug perforated with a hole for receiving material from the gasket.

6. The metal sheet according to claim 1, wherein the gasket is in elastomeric material.

7. The metal sheet according to claim 1, wherein the washer is in metal.

8. A turbojet engine strut cowl, including at least one metal sheet according to claim 1.

9. The turbojet engine strut cowl, according to claim 8, formed by the metal sheet as a single piece.

* * * * *